US009065730B2

(12) United States Patent
Craig et al.

(10) Patent No.: US 9,065,730 B2
(45) Date of Patent: Jun. 23, 2015

(54) NETWORK CAPACITY PLANNING

(71) Applicant: Amazon Technologies, Inc., Reno, NV (US)

(72) Inventors: Joseph L. Craig, Shoreline, WA (US); Alan M. Judge, Dublin (IE); Colin J. Whittaker, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/180,961

(22) Filed: Feb. 14, 2014

(65) Prior Publication Data

US 2014/0269256 A1    Sep. 18, 2014

Related U.S. Application Data

(63) Continuation of application No. 13/172,701, filed on Jun. 29, 2011, now Pat. No. 8,654,629.

(51) Int. Cl.
| | |
|---|---|
| *H04J 3/14* | (2006.01) |
| *H04L 12/24* | (2006.01) |
| *H04L 12/703* | (2013.01) |
| *H04L 12/707* | (2013.01) |
| *H04L 12/803* | (2013.01) |

(52) U.S. Cl.
CPC .......... *H04L 41/0663* (2013.01); *H04L 45/28* (2013.01); *H04L 45/22* (2013.01); *H04L 41/145* (2013.01); *H04L 41/0896* (2013.01); *H04L 41/0668* (2013.01); *H04L 47/125* (2013.01)

(58) Field of Classification Search
USPC ......... 370/217, 218, 225, 229, 230, 231, 235, 370/237, 252, 254, 351, 468; 709/238
See application file for complete search history.

(56) References Cited

U.S. PATENT DOCUMENTS

| | | | |
|---|---|---|---|
| 6,381,218 B1 | 4/2002 | McIntyre et al. | |
| 6,519,461 B1 | 2/2003 | Andersson et al. | |
| 7,864,751 B2 | 1/2011 | Greenberg | |
| 8,477,597 B2 | 7/2013 | Zhang et al. | |
| 8,654,629 B1 * | 2/2014 | Craig et al. ................... | 370/218 |
| 2005/0195739 A1 * | 9/2005 | Grover et al. ................. | 370/225 |
| 2005/0265255 A1 | 12/2005 | Kodialam et al. | |
| 2008/0165685 A1 | 7/2008 | Weiss et al. | |
| 2009/0059793 A1 * | 3/2009 | Greenberg .................... | 370/235 |
| 2010/0076618 A1 * | 3/2010 | El-Gasseir et al. ........... | 700/297 |
| 2010/0302935 A1 * | 12/2010 | Zhang et al. .................. | 370/218 |

* cited by examiner

*Primary Examiner* — Phuongchau Ba Nguyen

(74) *Attorney, Agent, or Firm* — Knobbe, Martens, Olson & Bear, LLP

(57) ABSTRACT

Systems, methods and interfaces are provided for the modeling of network data capacity for a network corresponding to a set of nodes interconnected via point-to-point network paths. A network capacity processing system obtains demand estimates for the nodes and network paths of the network. The network capacity processing system then identifies a set of failure scenarios for the network nodes and network paths. The network capacity processing system then generates of a set of processing results corresponding to load estimates for the network paths of the network and based on applying the set of failure scenarios to the model of network data capacity. Utilizing data capacity models, failure scenarios and set of processing results, the network capacity processing system can provide for network capacity planning or contingency planning.

20 Claims, 8 Drawing Sheets

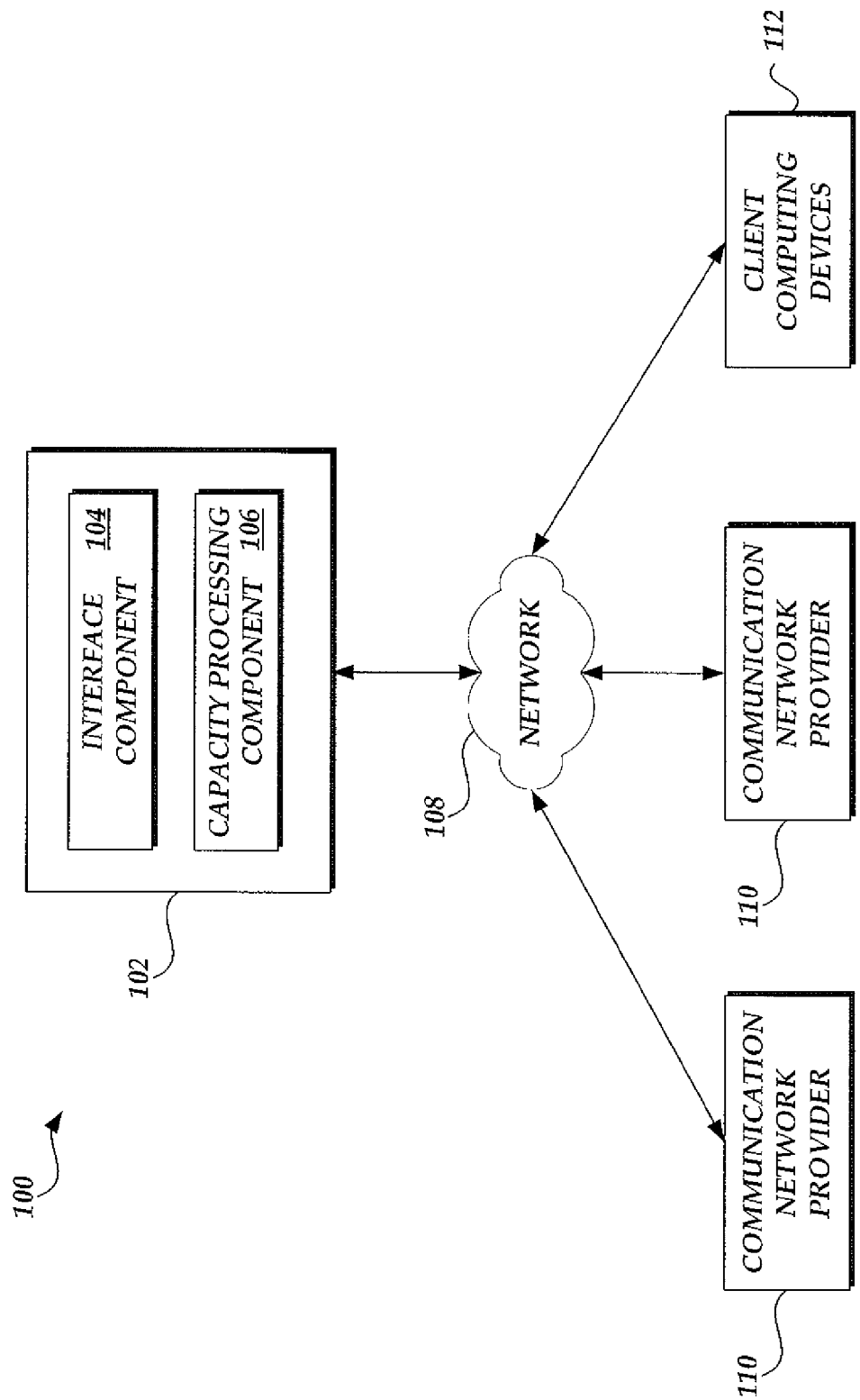

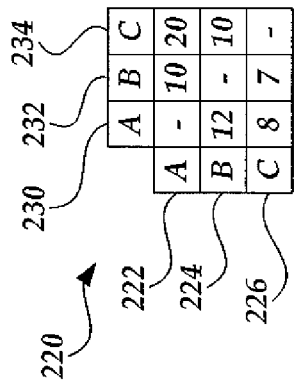
Fig.2B1.
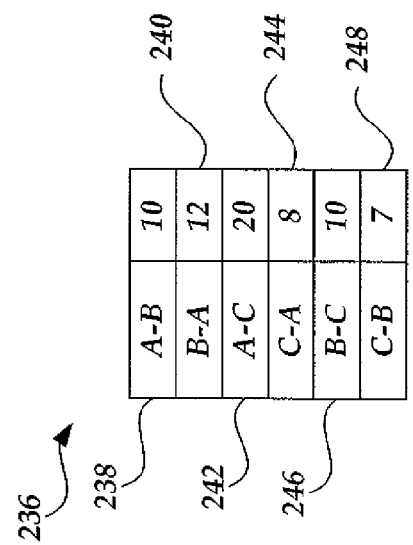
Fig.2B2.
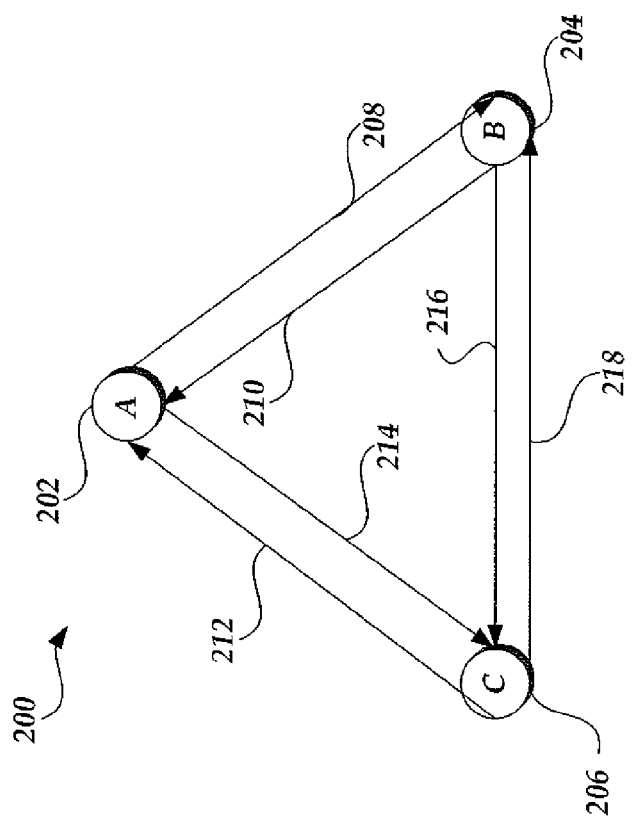
Fig.2A.

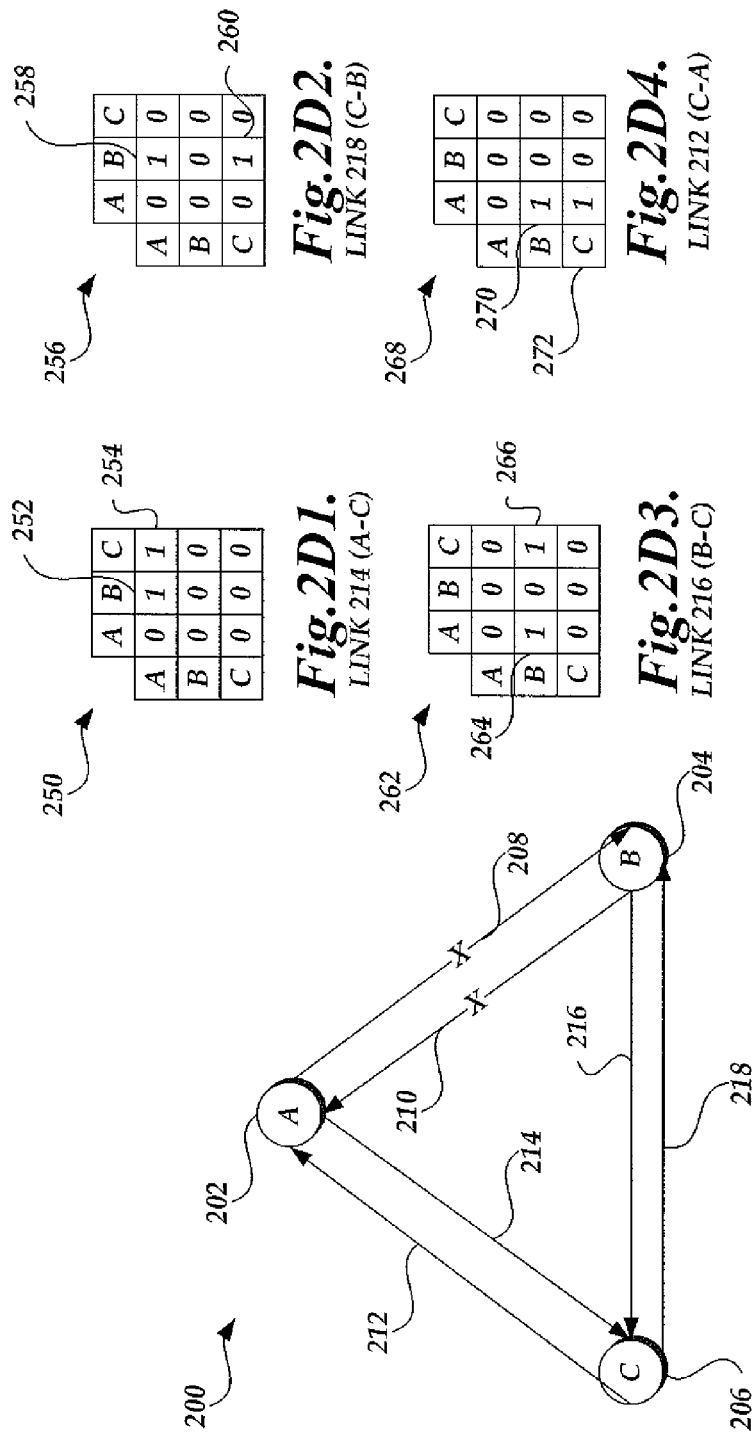
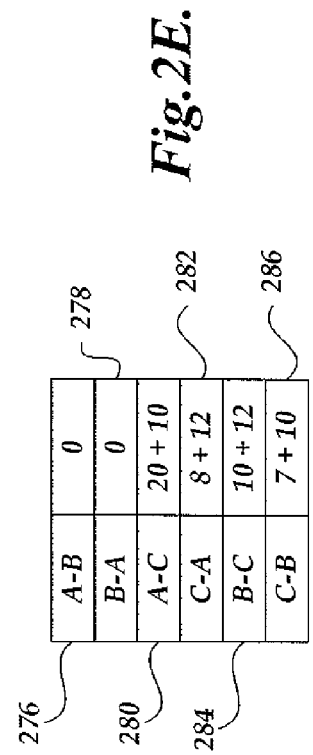

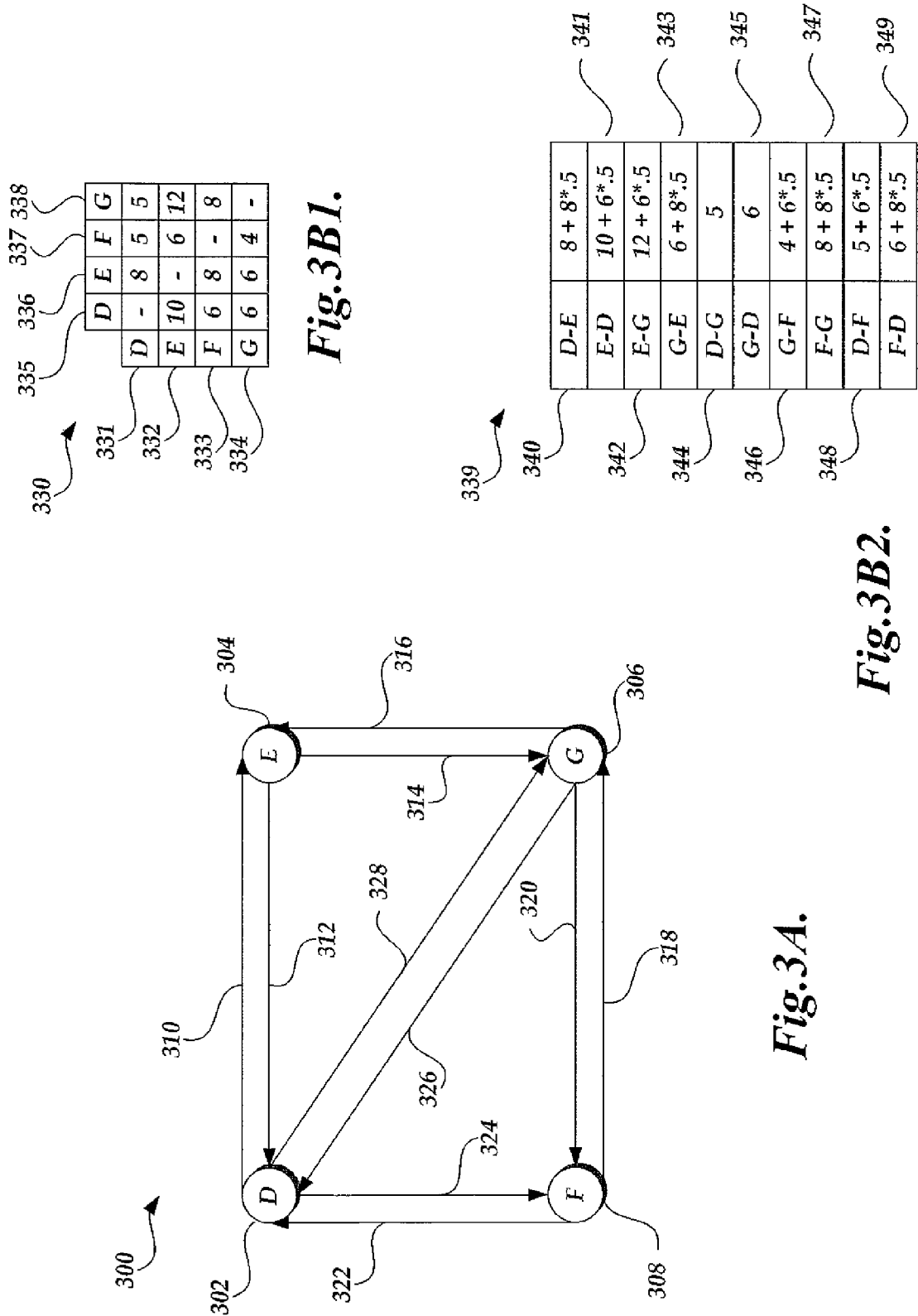

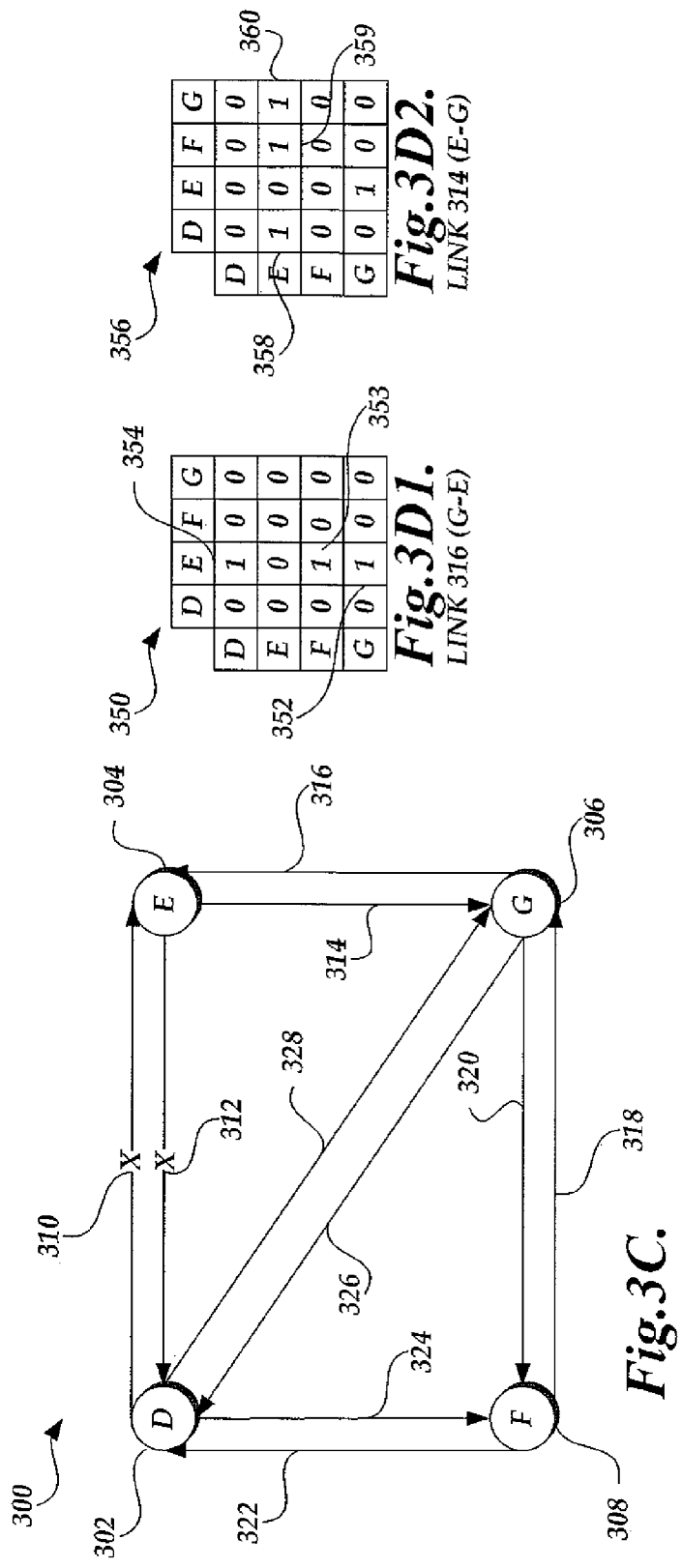

Fig.3D8.
LINK 318 (F-G)

|   | D | E | F | G |
|---|---|---|---|---|
| D | 0 | .5 | 0 | 0 |
| E | 0 | 0 | 0 | 0 |
| F | 0 | 1 | 0 | 1 |
| G | 0 | 0 | 0 | 0 |

Fig.3D7.
LINK 322 (F-D)

|   | D | E | F | G |
|---|---|---|---|---|
| D | 0 | 0 | 0 | 0 |
| E | 0 | .3 | 0 | 0 |
| F | 1 | 0 | 0 | 0 |
| G | 0 | 0 | 0 | 0 |

Fig.3E.

| D-E | 0 |
| E-D | 0 |
| E-G | 12 + 6 + 10 |
| G-E | 6 + 8 + 8 |
| D-G | 5 + 8*.5 |
| G-D | 10*.7 + 6 |
| G-F | 10*.3 + 6 + 4 |
| F-G | 8*.5 + 8 + 8 |
| D-F | 8*.5 + 5 |
| F-D | 10*.3 + 6 |

NETWORK CAPACITY PLANNING

RELATED APPLICATIONS

Incorporation by Reference to any Priority Applications

Any and all applications for which a foreign or domestic priority claim is identified in the Application Data Sheet as filed with the present application are incorporated by reference under 37 CFR 1.57 and made a part of this specification.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

For organizations providing data center functionality or organizations utilizing data functionality, such as in commerce applications, network capacity for facilitating the exchange of data can be a key concern. In some situations, the ordering and implementation of network equipment can require months of lead time and significant capital investments. Accordingly, in one approach, communication network providers may make advanced investments in equipment and processes that require a longer lead time or in the event of an order backlog. However, advanced investments in equipment can be inefficient and result in overbuilding or overproduction of network capacity. In another approach, communication network providers can manually estimate network equipment capacity or utilization and project network equipment needs.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 1 is a block diagram depicting an illustrative environment for network capacity management;

FIG. 2A is a block diagram illustrative a model of a set of network nodes interconnected via network paths;

FIG. 2B1 is a diagram of a table illustrating the mapping of point-to-point demand between the network nodes of the model of FIG. 2A;

FIG. 2B2 is a diagram of a table illustrating the projection of load on the network paths between network nodes of the model of FIG. 2A according to the demand illustrated in FIG. 2B1;

FIG. 2C is a block diagram of the network model of FIG. 2A illustrating the modeling of a failure scenario;

FIGS. 2D1-2D4 are diagrams illustrating a set of failure matrices for approximating at least a portion of the routing of data traffic on network paths between network nodes for the failure scenario of FIG. 2C;

FIG. 2E is a diagram of the table of FIG. 2B illustrating the projection of load on network paths between network nodes of FIG. 2A based on application of the failure matrices corresponding to a failure scenario;

FIG. 3A is a block diagram illustrative a model of a set of network nodes interconnected via network paths;

FIG. 3B1 is a diagram of a table illustrating the mapping of point-to-point demand between the network nodes of the model of FIG. 3A;

FIG. 3B2 is a diagram of a table illustrating the modeling of load on the network paths between nodes of the model of FIG. 3A according to the demand illustrated in FIG. 2B1;

FIG. 3C is a block diagram of the network model of FIG. 3A illustrating the modeling of a failure scenario;

FIGS. 3D1-3D8 are diagrams illustrating a set of failure matrices for approximating at least a portion of the routing of data traffic on network paths between network nodes for the failure scenario of FIG. 3C;

FIG. 3E is a diagram of the table of FIG. 3B illustrating the projection of load on network paths between network nodes of FIG. 3C based on application of the failure matrices corresponding to a failure scenario;

FIG. 4 is a flow diagram of a network load capacity processing routine implemented by network capacity processing system.

DETAILED DESCRIPTION

Figure 4:
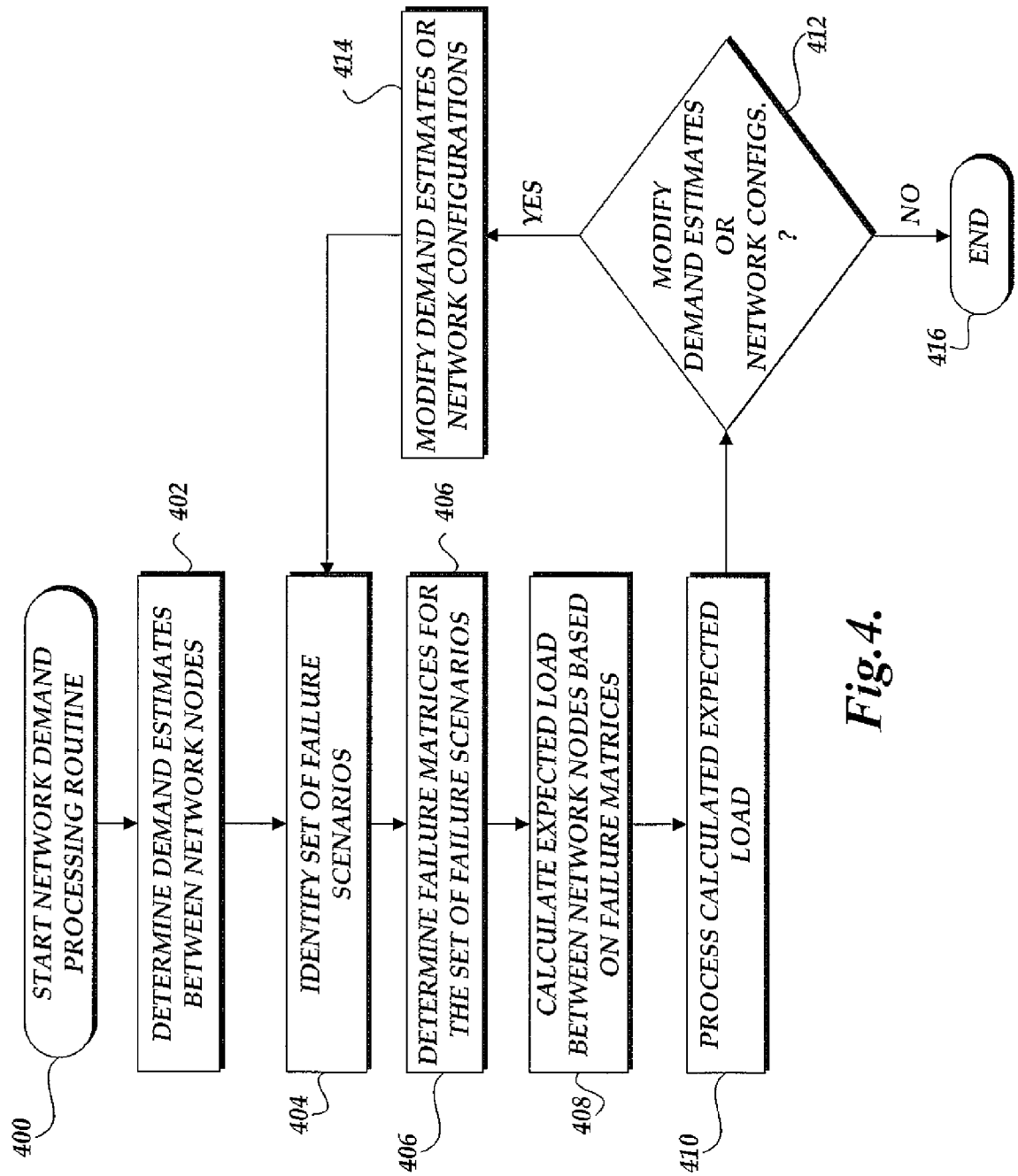

Generally described, the present disclosure relates to network capacity modeling and data processing. More specifically, aspects of the present disclosure relate to the modeling of network data link or path load estimates for a network corresponding to a set of nodes interconnected via point-to-point network paths. Additional aspects of the present disclosure relate to the modeling of routing of data packets between one or more network nodes and responsive to a set of failure scenarios. Still further aspects of the present disclosure relate to the generation of a set of processing results based on applying the set of modeled failure scenarios to the model of network data demand estimates. Finally, aspects of the present disclosure relate to the utilization of the network data demand estimates, models of failure scenarios and set of processing results for network capacity planning or contingency planning. Although aspects of the present disclosure will be described with regard to illustrative network models and communication paths, capacity measurements, user displays and processing results, one skilled in the relevant art will appreciate that the disclosed embodiments are illustrative in nature and should not be construed as limiting.

With reference to FIG. 1, an illustrative environment for network capacity management system 100 is provided. The network capacity management system 100 includes a network capacity processing system 102. Illustratively, the network capacity processing system 102 can obtain network capacity demand data for an identified communication network or portion of a network. The identified communication network (or portion thereof) can be illustratively modeled as a collection of network nodes and point-to-point network paths. The network capacity demand data can be observed or measured in accordance with utilization of the communication network. Additionally, at least some portion of the network capacity demand data can be constructed based on processing measured data inputs. Illustratively, the network capacity demand data corresponds to data between the identified network nodes of the communication network. Using the network capacity demand data as input, the network capacity processing system 102 can generate estimates of loads on network paths, or links, between the network nodes.

The network capacity processing system 102 also obtains or determines failure scenarios for a network capacity model and generates failure matrices corresponding to an anticipated or modeled result of the failure scenario on the point-to-point network paths in the modeled network. Still further, the network capacity processing system 102 processes the network capacity demand data with the generated set of failure scenarios to generate or identify the anticipated result of projected network load on the network paths between network nodes (e.g., the link or load path) in each of the network failure scenarios. Finally, the network capacity processing system 102 can further process the anticipated result of network capacity to facilitate network capacity planning.

Illustratively, the network capacity processing system 102 can include an interface component 104 and a capacity processing component 106, alone or in combination, to facilitate one or more of the above identified functions of the network capacity processing system 102. Additionally, although the network capacity processing system 102 is illustrated as a single system or component of the network capacity management system 100, one skilled in the relevant art will appreciate that the network capacity processing system 102 can be implemented by any number of computing devices or hardware components. Still further, the network capacity processing system 102 can be implemented as service or functionality that is implemented or invoked by utilization of application programming interfaces ("APIs") or other communication protocols utilized in conjunction with a communication network 108, such as the Internet, private networks, and the like. Although the network capacity processing system 102 relates to the processing of network capacity of a target communication network, or portion thereof, the network capacity processing system 102 does not need to be in direct communication with the target communication network nor have access (either directly or indirectly) with the target communication network. Accordingly, a target communication network may include a number of other computing device and network components and is not represented in FIG. 1.

In one embodiment, the network capacity processing system 102 may be in communication with a number of computing devices to facilitate interaction or processing of network capacity information. In one aspect, the network capacity processing system 102 may be in communication with one or more communication network providers 110. The communication network provider 110 may provide direct access to target communication networks or provide information related to a target communication networks. The communication network provider 110 can also provide interfaces between a network administrator associated with a target communication network and the network capacity processing system 102. The network capacity management system 100 can also include one or more client computing devices 112 that provide information to the network capacity processing system 102 or obtain information network capacity processing system, but that may not be directly associated with, or provided by a target communication network.

One skilled in the relevant art will appreciate that the network capacity processing system 102, communication network 108, communication network provider 112 and client computing devices 112 may be configured in a variety of ways and may be dependent on specific function and role of the network capacity processing system 102. Such different or alternative configurations should be considered to be within the scope of the present disclosures. Still further, although the components of the network capacity management system 100 have been generally referred to as systems, components or devices, one skilled in the relevant art will appreciate that the implementation of any referenced system, component or device may include necessary hardware, such a processing units, memory, buses, network components, etc. and could incorporate additional software applications or network protocols to achieve the described function.

With reference now to FIG. 2A-2E, an illustrative network capacity planning and failure analysis process for a target communication network will be described. One skilled in the relevant art will appreciate, that the disclosed target communication network model, network demand information, anticipated routing predictions, and failure scenarios are merely illustrative in nature and should not be construed as limiting. With reference to FIG. 2A, an illustrative model 200 of a target communication network includes a number of network nodes 202, 204, and 206. The nodes are in communication via directional-based, point-to-point network paths 208, 210, 212, 214, 216, and 218. As illustrated in FIG. 2A, each network node has a point-to-point network path to the other nodes in the target communication network. However, a target communication network (and its corresponding network model) may include single directional point-to-point network paths. Additionally, a target communication network (and its corresponding network model) may be made up of a larger number of network nodes in which at least some of the network nodes do not have any point-to-point network paths between them. Still further, one or more network nodes may have more than one point-to-point network path to another network node in the communication network. Additionally, although the point-to-point network paths are considered to be direct between nodes, one skilled in the relevant art will appreciate that various networking devices may be utilized and implemented between the network nodes to facilitate the identified network paths. Still further, one skilled in the relevant art will appreciate that although one or more network paths may exist between network nodes, the load experienced at each network path may not be equally distributed and some network paths may not experience any load.

With reference to FIGS. 2B1 and 2B2, in an illustrative embodiment, the network capacity processing system 102 obtains or measures demand related to the exchange of data (e.g., data packets) between the network nodes (202, 204, 206) along the identified point-to-point network paths (208-218). The demand information may correspond to real time demand information, partial real-time demand information, extrapolated information, or statistically processed information. Still further, demand information may correspond to estimated demand in accordance with projected business cases. Illustratively, the demand information may be represented in terms of a variety of units of measurement. As illustrated in FIG. 2B1, a table 220 includes a series of rows 222, 224, 226 and columns 228, 230, 232 that form a matrix of the measured demand or load information between pairs of nodes in the model 200. In some embodiments, the table 220 may be populated with default values or normalized values for demand between any two identified nodes in the model. The default or normalized values may be updated with actual measured values, replaced with actual measured values, or replaced with forecasted future values.

With reference now to FIG. 2B2, using the demand (FIG. 2B1) as an input, a table 236 of the modeled link load or network load can be generated. Illustratively, demand may be considered static for purposes of the modeling of various effects on various failure scenarios. Table 236 includes entries 28, 240, 242, 244, 246, and 248 for each identifiable link in the modeled network 200 that identify the modeled load for a respective link based on the demand. Illustratively, table 236 corresponds to the modeled load based on a non-failure scenario. Accordingly, the modeled load for each network path is similar to a respective entry in the demand table 220. However, the modeled load does not have to equate to demand, even in non-failure scenarios.

Turning now to FIGS. 2C-2E, in aspect of the present disclosure, the network capacity processing system 102 can generate a series of failure scenarios for the modeled, target communication network. For example, a set of failure scenarios can correspond to the anticipated effect of the failure of each of the one or more of the point-to-point network paths, the failure of the point-to-point network paths between two networks nodes, the failure of groupings of point-to-point network paths, and combinations thereof. Illustratively, the anticipated failure scenario is based on the modeled network 200 utilizing communication routing protocols, such as Open Shortest Path First ("OSPF"), in which the routing of data packets between nodes along point-to-point network paths is independent of the current demand at the node. However, in other embodiments, the anticipated failure scenario can be based on the modeled network 200 utilizing a communication routing protocol in which routing decisions are based, at least in part, on traffic awareness or traffic reservation.

In an illustrative embodiment, the anticipated failure scenario can be represented as a set of matrices, in which each matrix in the set of matrices is reflective of the data packet routing effects that will likely be experienced along one or more of the point-to-point network paths. As will be described in greater detail below, the set of matrices can be applied to the previously determined demand information, as illustrated in FIG. 2B1, for the target communication network. The result of such an application can correspond to the generation of a new table of estimates reflective of the anticipated load at one or more of the point-to-point network paths in the event of the specified failure modeled in the failure scenario. The process is then repeated for each failure scenario in the set of failure scenario.

With reference to FIG. 2C, assume one of the failure scenarios in an illustrative set of failure scenarios corresponds to the failure of the point-to-point network path 208 and point-to-point network path 210, both of which represent a respective directional network path between node 202 ("A") and node 204 ("B"). Additionally, assume that based on the routing protocol implemented in the model network 200, the anticipated effect of a failure along path 208 in the modeled failure would result in the diversion of data traffic along path 214, which is between node 202 and node 206 and path 218 which is between node 206 and 204. Additionally, assume that the anticipated effect of a failure of path 210 would result in the diversion of data traffic along path 216, which is between node 204 and node 206, and path 212, which is between node 206 and 202.

In an illustrative embodiment, a series of matrices for modeling the anticipated routing results at the plurality of network nodes and point-to-point network paths in the network model 200. The series of matrices include a matrix for each point-to-point network path in the network model 200. Each matrix is populated with proportional amount of the estimated demand that may be experienced by corresponding point-to-point network path, which may or may be equally distributed. The values in each of the matrices can be represented as a range of numerical values representative of a percentage or proportion of the previously estimated traffic demand that would be experienced at the path based on the modeled failure. For example, a range of values can be from "0" to "1" in which the sum of all the values across the set of matrices for a failure scenario correspond to a value of less than or equal to one.

With reference to FIG. 2D1, a matrix 250 can be generated that models the effect of data routing for the specified failure scenario for path 214, link A-C. Illustratively, all of the inter-node traffic demands in the model network 200 are illustrated as a cell in the matrix 250. As illustrated in FIG. 2D1, the matrix 250 indicates at cell 252 that the point-to-point network path 214 would likely receive 100% of the data traffic demand attributed between node A 202 and node B 204. This demand was previously attributed to point-to-point network path 208, link A-B in FIG. 2B2. Additionally, the matrix 250 indicates at cell 254 that the point-to-point network path 214 would likely receive 100% of the data traffic demand attributed between node A 202 and node C 206 (FIG. 2B2).

With reference to FIG. 2D2, a matrix 256 can be generated that models the effect of data routing for the specified failure scenario for path 218, link C-B. In a similar manner, all of inter-node traffic demands in the model network 200 are illustrated as a cell in the matrix 256. As illustrated in FIG. 2D2, the matrix 256 indicates at cell 258 that the point-to-point network path 218 would likely receive 100% (e.g., a value of "1") of the data traffic demand attributed between node A 202 and node B 204. Similar to matrix 204, this demand was previously attributed to point-to-point network path 208, link A-B in FIG. 2B2. Additionally, the matrix 256 indicates at cell 260 that the point-to-point network path 218 would likely receive 100% of the data traffic previously demand attributed between node C 206 and node B 204 (FIG. 2B2).

With reference to FIG. 2D3, a matrix 262 can be generated that models the effect of data routing for the specified failure scenario for path 216, link B-C. In a similar manner, all of the inter-node traffic demands in the model network 200 are illustrated as a cell in the matrix 262. As illustrated in FIG. 2D3, the matrix 262 indicates at cell 264 that the point-to-point network path 216 would likely receive 100% (e.g., a value of "1") of the data traffic demand attributed between node B 204 and node A 202. This demand was previously attributed to point-to-point network path 210, link B-A (FIG. 2B2). Additionally, the matrix 262 indicates at cell 266 that the point-to-point network path 216 would likely receive 100% of the data traffic demand attributed between node B 204 and node C 206.

Finally, with reference to FIG. 2D4, a matrix 268 can be generated that models the effect of data routing for the specified failure scenario for path 212, link C-A. In a similar manner, all of the inter-node traffic demands in the model network 200 are illustrated as a cell in the matrix 268. As illustrated in FIG. 2D4, the matrix 268 indicates at cell 270 that the point-to-point network path 216 would likely receive 100% (e.g., a value of "1") of the data traffic demand attributed between node B 204 and node A 202. This demand was previously attributed to point-to-point network path 210, link B-A (FIG. 2B2). Additionally, the matrix 268 indicates at cell 272 that the point-to-point network path 212 would receive 100% of the data traffic previously demand attributed between node C 206 and node A 202.

With reference to FIG. 2E, illustratively, the capacity processing component 108 (FIG. 1) applies matrices 250, 256, 262, 268 (FIGS. 2D1-2D4) to the demand estimates 220 (FIG. 2B1) to generate a new table 274 of network path load for the modeled network 200. In this embodiment, capacity processing component 106 generates a sum of the application of the matrices 250, 256, 262, 268 to generate the anticipated effect of routing results based on the modeled failure, table 274. As illustrated in FIG. 2E, each network path that would be anticipated to receive an increase or decrease is identified. Specifically, table 274 includes entries 276, 278, 280, 282, 284, and 286 for each identifiable link in the modeled network 200 that identify the modeled load for a respective link based on the demand. Accordingly, the modeled load for each network path illustrates the anticipated effect on the previously modeled load on the network paths, as illustrated in table 236 (FIG. 2B2), and responsive to the failure scenario.

With reference now to FIG. 3A-3E, another illustrative network capacity planning and failure analysis process for a target communication network will be described. One skilled in the relevant art will appreciate, that the disclosed target communication network model, capacity information, and failure predictions are merely illustrative in nature and should not be construed as limiting. With reference to FIG. 3A, an illustrative model 300 of a target communication network includes a number of network nodes 302, 304, 306, and 308. The nodes are in communication via directional-based, point-to-point network paths 310, 312, 314, 316, 318, 320, 322, 324, 326, and 328. As illustrated in FIG. 3A, most of the network nodes have a point-to-point network path to the other nodes in the target communication network, with the exception of node 304 to node 308. However, a target communication network (and its corresponding network model) may include single directional point-to-point network paths. Additionally, a target communication network (and its corresponding network model) may be made up of a larger number of network nodes in which at least some of the network nodes do not have any point-to-point network paths. Still further, although the point-to-point network paths are considered to be direct between nodes, one skilled in the relevant art will appreciate that various networking devices may be utilized and implemented between the network nodes to facilitate the identified network paths. As previously discussed, although a network path, or point-to-point link, may exist between nodes, one skilled in the relevant art will appreciate that traffic may not be routed along each possible path or that a disproportionate amount of traffic may be routed along a single point-to-point link for various reasons, such as a lower capacity of the point-to-point link.

With reference to FIGS. 3B1 and 3B2, in an illustrative embodiment, the network capacity processing system 102 obtains or measures demand related to the exchange of data (e.g., data packets) between the network nodes (302, 304, 306, and 308) along the identified point-to-point network paths (310-328). The demand information may correspond to real time demand information, partial real-time demand information, extrapolated information, or statistically processed information. As previously described, demand information may correspond to estimated demand in accordance with projected business cases. Illustratively, the demand information may be represented in terms of a variety of units of measurement. As illustrated in FIG. 3B1, a table 330 includes a series of rows 331, 332, 333, and 334 and columns 335, 336, 337, and 338 that form a matrix of the measure demand for between the nodes in the model 300. In some embodiments, the table 330 may be populated with default values or normalized values for demand between any two identified nodes in the model. The default or normalized values may be updated with actual measured values, replaced with actual measured values, or replaced with forecasted future values. Additionally, the table 330 can identify demand (332, 337) and (333, 336) between nodes, such as node 304 "E" and node 308 "F", even though the network model 300 does not include a direct point-to-point path between the nodes.

With reference now to FIG. 3B2, using the demand (FIG. 3B1) as an input, a table 330 of the modeled link load or network load can be generated. Illustratively, demand may be considered static for purposes of the modeling various effects on various failure scenarios. Table 339 includes entries 340-349 for each identifiable link in the modeled network 300 that identify the modeled load for a respective link based on the demand. Illustratively, table 339 corresponds to the modeled load based on a non-failure scenario. Accordingly, the modeled load for each network path is similar to a respective entry in the demand table 330. Additionally, at least some portion of the load estimated for some network paths incorporates demand attributed between node F 306 and node E 304, since no direct network path exists between these two nodes. As described above, the modeled load does not have to equate to demand, even in non-failure scenarios.

With reference to FIG. 3C and similar to FIG. 2C, assume for one of the failure scenarios in an illustrative set of failure scenarios corresponds to the failure of the point-to-point network path 310 and point-to-point network path 312, both of which represent a respective directional path between node 302 ("A") and node 304 ("B"). Additionally, assume that the anticipated effect of such of the failure would result in the diversion of different percentages of the data traffic originally estimated for either path 310 or path 312. As previously discussed, the anticipated effect of a failure scenario can be modeled as a set of matrices, in which each matrix is populated with a proportional amount of the demand information on the assumption that one or more network paths (or other criteria) is no longer available.

With reference to FIG. 3D1, a matrix 350 can be generated that models the effect of data routing for the specified failure scenario for path 316, link G-E. Illustratively, all of the inter-node traffic demands in the model network 300 are illustrated as a cell in the matrix 350. Similar to the matrices of FIGS. 2D1-2D4, values in the matrix 350 can be represented as a range of numerical values representative of a percentage or proportion of the previously estimated data traffic that would be experienced at the path based on the modeled failure. As illustrated in FIG. 3D1, the matrix 350 indicates at cell 354 that the point-to-point network path 316 would likely receive 100% of the data traffic demand attributed between node D 302 and node E 304. This demand was previously attributed to point-to-point network path 312, link D-E in FIG. 3B2. The matrix 350 indicates at cell 353 that the point-to-point network path 316 would likely receive 100% of the data traffic demand attributed between node F 308 and node E 304. 50% of this demand was previously carried by point-to-point network path 316, and 50% of this demand was previously attributed to point-to-point network path 310, link D-E in FIG. 3B2. Additionally, the matrix 350 indicates at cell 352 that the point-to-point network path 316 would likely receive 100% of the data traffic previously demand attributed between node G 306 and node E 304 (FIG. 3B2).

With reference to FIG. 3D2, a matrix 356 can be generated that models the effect of data routing for the specified failure scenario for path 314, link E-G. In a similar manner, all of the inter-node traffic demands in the model network 300 are illustrated as a cell in the matrix 356. As illustrated in FIG. 3D2, the matrix 356 indicates at cell 358 that the point-to-point network path 314 would likely receive 100% (e.g., a value of "1") of the data traffic demand attributed between node E 304 and node D 302. This demand was previously attributed to point-to-point network path 312, link E-D (FIG. 3B2). The matrix 356 indicates at cell 359 that the point-to-point network path 314 would likely receive 100% of the data traffic demand attributed between node E 304 and node F 308. 50% of this demand was previously carried by point-to-point network path 314, and 50% of this demand was previously attributed to point-to-point network path 312, link E-D in FIG. 3B2. Additionally, the matrix 356 indicates at cell 360 that the point-to-point network path 314 would receive 100% of the data traffic demand attributed between node E 304 and node G 306.

With reference to FIG. 3D3, a matrix 362 can be generated that models the effect of data routing for the specified failure scenario for path 320, link G-F. In a similar manner, all of the inter-node traffic demands in the model network 300 are illustrated as a cell in the matrix 362. As illustrated in FIG. 3D3, the matrix 362 indicates at cell 366 that the point-to-point network path 320 would likely receive 30% (e.g., a value of "0.3") of the data traffic demand attributed between node E 304 and node D 302. This demand was previously attributed to point-to-point network path 312, link E-D (FIG. 3B2). Illustratively, the diversion of the percentage of traffic between paths 320 and 326 can be attributed to the modeled routing protocol or various configurations that can be applied in accordance with the modeled routing protocol. The matrix 362 indicates at cell 365 that the point-to-point network path 320 would likely receive 100% of the data traffic demand attributed between node E 304 and node F 308. 50% of this demand was previously carried by point-to-point network path 314, and 50% of this demand was previously attributed to point-to-point network path 312, link E-D in FIG. 3B2. Additionally, the matrix 362 indicates at cell 364 that the point-to-point network path 320 would receive 100% of the data traffic demand attributed between node G 306 and node F 308.

With reference to FIG. 3D4, a matrix 368 can be generated that models the effect of data routing for the specified failure scenario for path 326, link G-D. In a similar manner, all of the inter-node traffic demands in the model network 300 are illustrated as a cell in the matrix 368. As illustrated in FIG. 3D4, the matrix 368 indicates at cell 372 that the point-to-point network path 326 would likely receive 70% (e.g., a value of "0.7") of the data traffic demand attributed between node E 304 and node D 302 (FIG. 3B2). This demand was previously attributed to point-to-point network path 312, link E-D. As described above, the diversion of the percentage of traffic between paths 320 and 326 can be attributed to the modeled routing protocol or various configurations that can be applied in accordance with the modeled routing protocol. Additionally, the matrix 368 indicates at cell 370 that the point-to-point network path 326 would likely receive 100% of the data traffic previously demand attributed between node G 306 and node D 302 (FIG. 3B2).

Figure 5:
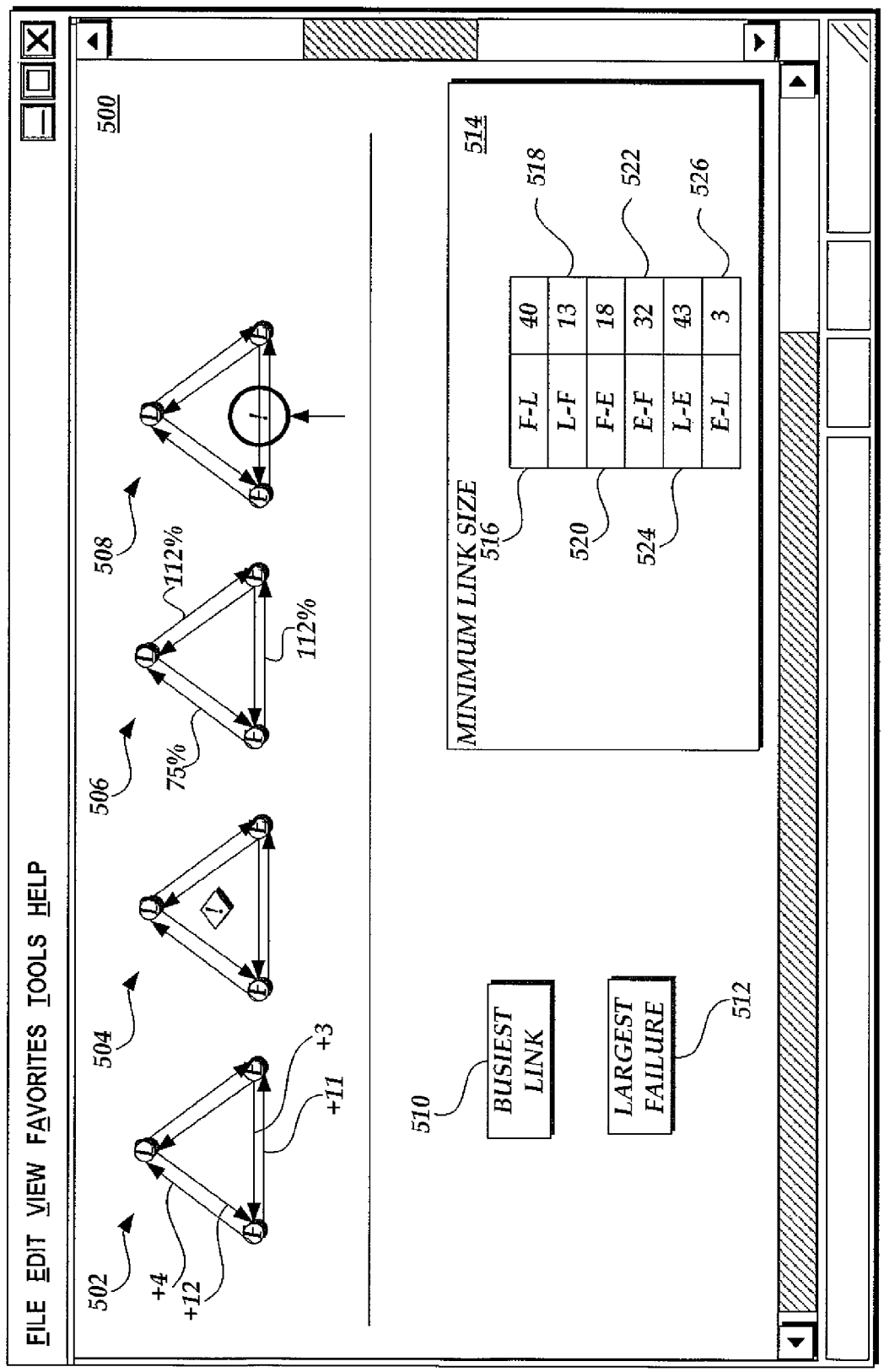
FIG. 5 is a block diagram of a screen display illustrating an exemplary user interface providing failure scenario information.

With reference to FIG. 3D5, a matrix 374 can be generated that models the effect of data routing for the specified failure scenario for path 324, link D-F. In a similar manner, all of the inter-node traffic demands in the model network 300 are illustrated as a cell in the matrix 374. As illustrated in FIG. 3D5, the matrix 374 indicates at cell 378 that the point-to-point network path 324 would likely receive 50% (e.g., a value of "0.5") of the data traffic demand attributed between node D 302 and node E 304. This demand was previously attributed to point-to-point network path 310, link D-E (FIG. 3B2). Illustratively, the diversion of the percentage of traffic between paths 324 and 328 can be attributed to the modeled routing protocol or various configurations that can be applied in accordance with the modeled routing protocol. Additionally, the matrix 374 indicates at cell 376 that the point-to-point network path 324 would likely receive 100% of the data traffic demand attributed between node D 302 and node F 308 (FIG. 3B2).

With reference to FIG. 3D6, a matrix 380 can be generated that models the effect of data routing for the specified failure scenario for path 328, link D-G. In a similar manner, all of the inter-node traffic demands in the model network 300 are illustrated as a cell in the matrix 380. As illustrated in FIG. 3D6, the matrix 380 indicates at cell 382 that the point-to-point network path 328 would likely receive 50% (e.g., a value of "0.5") of the data traffic demand attributed between node D 302 and node E 304. This demand was previously attributed to point-to-point network path 310, link D-E (FIG. 3B2). Illustratively, the diversion of the percentage of traffic between paths 324 and 328 can be attributed to the modeled routing protocol or various configurations that can be applied in accordance with the modeled routing protocol. Additionally, the matrix 380 indicates at cell 384 that the point-to-point network path 328 would likely receive 100% of the data traffic demand attributed between node D 302 and node G 306 (FIG. 3B2).

With reference to FIG. 3D7, a matrix 386 can be generated that models the effect of data routing for the specified failure scenario for path 322, link F-D. In a similar manner, all of the inter-node traffic demands in the model network 300 are illustrated as a cell in the matrix 386. As illustrated in FIG. 3D7, the matrix 386 indicates at cell 388 that the point-to-point network path 322 would likely receive 30% (e.g., a value of "0.3") of the data traffic demand attributed between node F 308 and node D 302. This demand was previously attributed to point-to-point network path 312, link E-D. In this embodiment, the additional traffic corresponds to the previous percentage of additional traffic attributed to path 320. Additionally, the matrix 386 indicates at cell 390 that the point-to-point network path 322 would likely receive 100% of the data traffic demand attributed between node F 308 and node D 302 (FIG. 3B2).

Finally, with reference to FIG. 3D8, a matrix 392 can be generated that models the effect of data routing for the specified failure scenario for path 318, link F-G. In a similar manner, all of the inter-node traffic demands in the model network 300 are illustrated as a cell in the matrix 392. As illustrated in FIG. 3D8, the matrix 392 indicates at cell 394 that the point-to-point network path 318 would likely receive 50% (e.g., a value of "0.5") of the data traffic demand attributed between node E 304 and node D 302. This demand was previously attributed to point-to-point network path 312, link E-D (FIG. 3B2). In this embodiment, the additional traffic corresponds to the previous percentage of additional traffic attributed to path 324. The matrix 392 indicates at cell 393 that the point-to-point network path 318 would likely receive 100% of the data traffic demand attributed between node F 308 and node E 304. 50% of this demand was previously carried by point-to-point network path 318, and 50% of this demand was previously attributed to point-to-point network path 310, link D-E in FIG. 3B2. Additionally, the matrix 392 indicates at cell 396 that the point-to-point network path 318 would receive 100% of the data traffic demand attributed between node F 308 and node G 306 (FIG. 3B2).

With reference to FIG. 3E, illustratively, the capacity processing component 106 (FIG. 1) applies matrices 350, 356, 362, 368, 374, 380, 386 and 392 (FIGS. 3D1-2D8) to the demand estimates 330 (FIG. 3B1) to generate a new table 400 of estimated network path load for the modeled network 300.

In this embodiment, capacity processing component 108 generates a sum of the application of the matrices 350, 356, 362, 368, 374, 380, 386, and 392 to generate the anticipated effect of routing results based on the modeled failure, table 400. As illustrated in FIG. 3E, each network path that would be anticipated to receive an increase or decrease is identified. Specifically, table 400 includes entries 401, 402, 403, 404, 405, 406, 407, 408, 409, and 410 for each identifiable link in the modeled network 300 that identify the modeled load for a respective link based on the demand. Accordingly, the modeled load for each network path illustrates the anticipated effect on the previously modeled load in table 339 (FIG. 3B2) responsive to the failure scenario.

In alternative embodiments of the resulting updated matrices of FIGS. 2E and 3E, the demand can also be represented as a percentage of known capacity of the network node/point-to-point network path. Additionally, the resulting value can be compared to threshold levels or percentages labeled/illustrated with the applied label or category. For example, a point-to-point network path may be colored in accordance with a determination of whether the anticipated demand would be below, meet, or exceed thresholds or limits. Additionally, the demand can be expressed in terms of demand below a threshold (e.g., a number of units until the demand meets a threshold) or demand above a threshold (e.g., a number of units that exceed a threshold). Illustratively, the network capacity processing system 102 can incorporate standard thresholds or capacities for all nodes. Alternatively, the network capacity processing system 102 can incorporate custom thresholds configured specifically for the networking and computing equipment at each node or based on configuration information provided by the target communication network administrator.

Turning now to FIG. 4, a routine 400 for processing network demand data according to failure scenarios implemented by the network capacity processing system 102 will be described. At block 402, the network capacity processing system 102 obtains or determines demand estimates between network nodes, generally referred to as demand information, for a model target communication network. As previously described, the demand information may correspond to real time demand information, partial real-time demand information, extrapolated information, statistically processed information, estimated demand in accordance with projected business cases and made be represented in terms of any unit of measurement. In some embodiments, the demand information may be populated with default values or normalized values based on the configuration of the model target communication network, similar communication networks, or generically applicable information. The default or normalized values may be updated with actual measured values or replaced with actual measured values in a real-time or substantially real-time basis. Illustrative tables identifying initial demand and load estimates were described with regard to FIGS. 2B1 and 2B2 and FIGS. 3B1 and 3B2.

At block 404, the network capacity processing system 102 identifies as set of failure scenarios to be applied to the model target communication network. In one embodiment, the set of failure scenarios can include failure scenarios for a failure of each point-to-point network path in the modeled target communication network. In other embodiments, the set of failure scenarios can include failure scenarios for failure of multiple point-to-point network paths in the modeled target communication network. For example, the network capacity processing system 102 may model the failure of both bi-directional network paths between two nodes, as illustrated generally in FIGS. 2 and 3. In another example, the network capacity processing system 102 may model the failure of a grouping of directional network paths based on a variety of grouping or organizational criteria. In further embodiment, the set of failure scenarios can include failure scenarios for failure of network nodes (and any point-to-point communication paths attached to the failed node(s). In still further embodiment, the failure scenarios can include the addition of new point-to-point network paths between network nodes, which can still be generally considered to a failure scenario for purposes of modeling the anticipated routing results. In still another embodiment, the set of failure scenarios can include various iterations of a modeled failure in which one or more weights or inputs that may influence the packet routing protocols are modified. In this embodiment, each separate modification/configuration can be considered a failure scenario in the set of failure scenarios. Alternatively, a set of failure scenarios may be repeated (e.g., the modeling of a failure of multiple network paths) for each modification/configuration. Additional or alternative failure scenarios may also be included.

At block 406, the network capacity processing system 102 determines a set of failure matrices for each failure scenario in the set of failure scenarios. As previously described, each matrix in the set of matrices is reflective of the data packet routing effects that will be experienced along one or more of the point to point network paths. As previously described, the anticipated failure scenario can be based on communication routing protocols in which the routing of data packets between nodes along point-to-point network paths is independent of the current demand at the node. The resulting values in each cell of a respective matrix can correspond to the anticipated proportional effect of the demand at the network path in view of the modeled failure scenario. Illustratively, the values in the various cells of each respective matrix are defined as a range of numerical values from zero to one in which the sum of all the values for any given demand across the set of failure matrices correspond to a value of less than or equal to one. Alternatively, the system may model some loss in demand traffic, such as due to packet drops or a failure of data integrity or failures that remove some portion of the systems that generate demand. In such embodiments, the sum of the range of values in the cells of the matrices may be less than one. Illustratively, the generation of the set of matrices in block 406 may be automated.

At block 408, the network capacity processing system 102 calculates the expected load between each of the network nodes in the modeled communication network for each of the failure scenarios in the set of failure scenarios. As illustrated in FIGS. 2 and 3, the network capacity processing system 102 can apply the set of failure matrices to the demand information to generate a new table of expected load. The application of the set of matrices to the demand information may be done automatically or semi-automatically by the network capacity processing system 102.

At block 410, the network capacity processing system 102 processes the set of updated link load projections. In one aspect, the network capacity processing system 102 can identify the busiest point-to-point network path across the multiple failure scenarios. In another aspect, the network capacity processing system 102 can identify the failure scenario that generated the largest increase in load for any network path or in which the capacity of any network path will be exceeded. In still a further aspect, the network capacity processing system 102 can generate various user interfaces that graphically illustrate the results of at least a portion of set of updated matrices. For example, the network capacity processing system 102 can generate, or causes to be generated, various graphical representations of model target communication network that identify the results of the processing in terms of color, shape, identifiers, or other labels. The network capacity processing system 102 can also generate various animations in which the changes to load information for one or more paths are animated on a screen display to illustrate various failure scenarios or to illustrate a time based progression of load information.

In still another aspect, the network capacity processing system 102 can generate notifications or communications, such as request for proposals, bids, purchase orders, that include specifications (e.g., demand capacities) identified in the set of update matrices. For example, the network capacity processing system 102 can identify a minimum capacity for network nodes or point-to-point network paths to ensure a minimal level of service. The minimum capacity information can be further provided in a form or notification to facilitate ordering of additional equipment. In another example, the network capacity processing system 102 can initiate, at least in part, the ordering process automatically. In still another example, the network capacity processing system 102 can integrate with calendaring functionality for scheduling ordering of network components. In still a further aspect, the network capacity processing system 102 can attribute probabilities of exceeded capacity of any node or point-to-point network path based on the set update matrices. Additional or alternative processing may also be incorporated.

At decision block 412, a test is conducted to determine whether the network capacity processing system 102 will repeat the modeling of the set of failure scenarios according to a different demand estimate or network configurations for the network equipment or routing protocols of the model target communication network. As described above, the network capacity processing system 102 can model a set of failure scenarios based on varying demand information. Additionally, the network capacity processing system 102 can model a set of failure scenarios based on varying configurations of the network routing protocols or network equipment in the model communication network. Accordingly, if the network capacity processing system 102 is to modify the demand estimates or network routing configurations at decision block 412, the appropriate modifications are made at block 414 and the routine 400 returns to block 404. Alternatively, if the network capacity processing system 100 does not need to modify the demand estimates or network routing configurations at decision block 412, the routine 400 terminates at block 416.

With reference to FIG. 5, an illustrative screen display 500 corresponding to the illustration of processing of failure scenarios on a model, target communication network. One skilled in the relevant art will appreciate, however, that the processing of failure scenarios can corresponds to the generation of numerous screen displays and interfaces. Accordingly, the screen display 500 is illustrative of various types of information that may be generated on a computing device collectively, or individually. Still further, although the screen display 500 illustrates various combinations or groupings of information, one skilled in the relevant art will appreciate that alternative combinations or groupings may also be incorporated into a screen display.

As illustrated in FIG. 5, the screen display 500 can include a number of graphical representations of the target communication network (or portions thereof) 502, 504, 506, 508. The graphical representations may include one or more categories that identify whether the anticipated load (based on demand information) can be processed or if one or more of the predicted failures will exceed predicted limits or thresholds for one or more the network paths. The graphical representations can also include labels that identify the total anticipated demand on a network node or point-to-point network path, the percentage of utilization calculated as the quotient of the total anticipated demand on a network node or point-to-point network path and the predicted limits of the respective network node or point-to-point network path, such as illustrated in graphical representation 502 and 506. The graphical representations can also include color coding, graphics or labels reflective of the anticipated total use, percentage of utilization, remaining capacity or exceed capacity, such as illustrated in graphical representation 504. The graphical representations can also identify anticipated additional failures or exceeded capacities, such as illustrated in graphical representation 508. As previously discussed, a graphical representation may be animated to demonstrate changes in load or multiple graphical representations may be utilized to illustrate various stages of utilization of the model target communication network or to illustrate specific failure scenarios.

The screen display 500 can further include a number of additional controls or displays that provide information associated with one or more of the processed failure scenarios, such as the busiest point-to-point network path 510 or largest failure 512. In one embodiment, the controls may be used to elicit additional processing by the network capacity processing system 102. In other embodiments, the controls may request additional inputs or configurations by a user. In still further embodiments, the displays may correspond to previously selected or configured information. In another embodiment, the screen display can further include a minimum link size table 514 that identifies minimum size of each point-to-point network path required to accommodate for an identified failure scenario or set of failure scenarios or the projected future link sizes required to accommodate forecasted demand, generally at 518-526.

It will be appreciated by those skilled in the art and others that all of the functions described in this disclosure may be embodied in software executed by one or more processors of the disclosed components and communications devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment.

Any process descriptions, elements, or blocks in the flow diagrams described herein or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data or components described above may be stored on a computer-readable medium and loaded into memory of the computing device using a drive mechanism associated with a computer readable storing the computer executable components such as a CD-ROM, DVD-ROM, or network interface further, the component or data can be included in a single device or distributed in any manner. Accordingly, general purpose computing devices may be configured to implement the processes, algorithms, and methodology of the present disclosure with the processing or execution of the various data or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing network capacity, the method comprising:
 determining demand estimates for a communication network, the communication network having a network configuration corresponding to a plurality of network nodes interconnected by network paths;
 identifying a set of failure scenarios for the communication network;
 for individual failure scenarios of the set of failure scenarios,
  modeling the failure scenario for the communication network, the failure scenario identifying a failure of at least one network path or network node;
  predicting routing results for data traffic between the plurality of network nodes and network paths based on the failure scenario, wherein the data traffic bypasses the at least one failed network path or network node;
  calculating load estimates for the at least one failure scenario based, at least in part on, the predicted routing results and the demand estimates;
  modeling changes to the network configuration of the communication network based, at least in part, on the calculated load estimates; and
  calculating updated load estimates for the failure scenario based, at least in part, on the changes to the network configuration of the communication network.

2. The method of claim 1 further comprising generating a first graphical output corresponding to the calculated load estimates for the at least one failure scenario and a second graphical output corresponding to the updated load estimates.

3. The method of claim 1, wherein modeling changes to the network configuration comprises modeling changes based on a modification to network equipment corresponding to the network nodes.

4. The method of claim 1, wherein modeling changes to the network configuration comprises modifying demand estimates for a communication network.

5. The method of claim 1, wherein the network path is a point-to-point network path.

6. The method of claim 1, wherein modeling the failure scenario includes modeling a set of failure scenarios for a failure of multiple network paths in the communication network.

7. The method of claim 1, wherein the failure scenario identifies a failure of a plurality of network paths and a plurality of network nodes.

8. The method of claim 1, wherein predicting routing results includes generating matrices indicative of data traffic routing in each network paths based on the failure scenario.

9. A non-transitory physical computer storage comprising computer-executable instructions stored thereon that, when executed in one or more processors, are configured to execute operations comprising:
 determining demand estimates for a communication network, the communication network having a network configuration corresponding to a plurality of network nodes interconnected by network paths;
 modeling a plurality of failure scenarios for the communication network, wherein individual failure scenarios identify a failure of at least one of a network path or a network node;
 predicting routing results for data traffic between the plurality of network nodes and network paths based on individual failure scenarios of the plurality of failure scenarios;
 calculating load estimates for individual failure scenarios of the plurality of failure scenarios based, at least in part on, the predicted routing results and the demand estimates; and
 based on the calculated load estimates for the plurality of failure scenarios, repeating the modeling of the plurality of failure scenarios using a different network configuration.

10. The computer-readable medium of claim 9 further comprising causing the generation of an output corresponding to the analysis of the load estimates.

11. The computer-readable medium of claim 9, wherein the demand estimates are based on at least one of a default demand applied to the plurality of network nodes and network paths and measured demand at the plurality of network nodes and network paths.

12. The computer-readable medium of claim 9, wherein the predicted routing results are based on routing protocols independent of a demand between each of the plurality of network nodes.

13. The computer-readable medium of claim 9, wherein the predicted routing results are based on routing protocols dependent on a demand between each of the plurality of network nodes.

14. A computer-implemented system comprising:
 an interface component, implemented on a computing device, the interface component operable to obtain demand estimates for a communication network, the communication network having a network configuration corresponding to a plurality of network nodes interconnected by network paths; and
 a network capacity processing system configured to:
  model at least one failure scenario for the communication network, the at least one failure scenario identifying a failure of at least one of a network path or a network node;
  predict routing results for data traffic between the plurality of network nodes and network paths based on the at least one failure scenario;
  calculate load estimates for the at least one failure scenario based, at least in part on, the predicted data traffic routing and demand estimates;
  based on the calculated load estimates for the plurality of failure scenarios, repeat the modeling of the at least on failure scenarios using a different network configuration; and
  cause the generation of an output corresponding to updated load estimates based on the different network configuration.

15. The system of claim 14, wherein the generation of an output includes causing the generation of at least one user interface includes at least one graphical representation of a failure scenario.

16. The system of claim 15, wherein the graphical representation is associated with a color indicative of the calculated load estimates for the at least one failure scenario.

17. The system of claim 14, wherein the graphical representation is associated with a category identification, the category identification indicative of the results of the calculated load estimates for the at least one failure scenario.

18. The system of claim 14, wherein the network capacity processing system is further configured to generate a matrix indicative of data traffic routing in each of the network paths based on an identified failure scenario.

19. The system of claim 14, wherein the at least one failure scenario includes a failure of a network path, a failure of each network path in the target communication network, addition of a network path, and a failure of a network node.

20. The system of claim 14, wherein the at least one failure scenario identifies at least one of a failure of a plurality of network paths and a plurality of network nodes.

* * * * *